July 30, 1929.   C. H. NORDELL   1,722,938
AUTOMATIC WATER SOFTENING APPARATUS
Original Filed Aug. 29, 1922   4 Sheets-Sheet 2
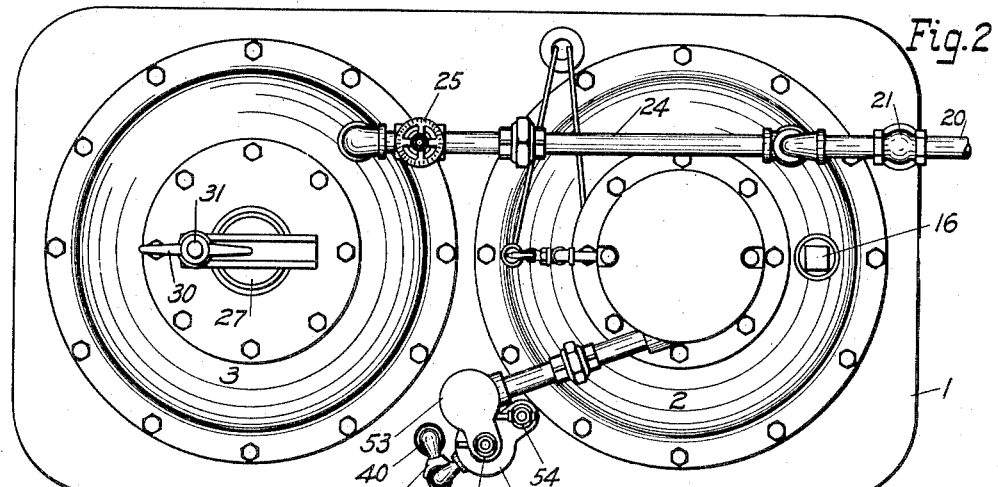
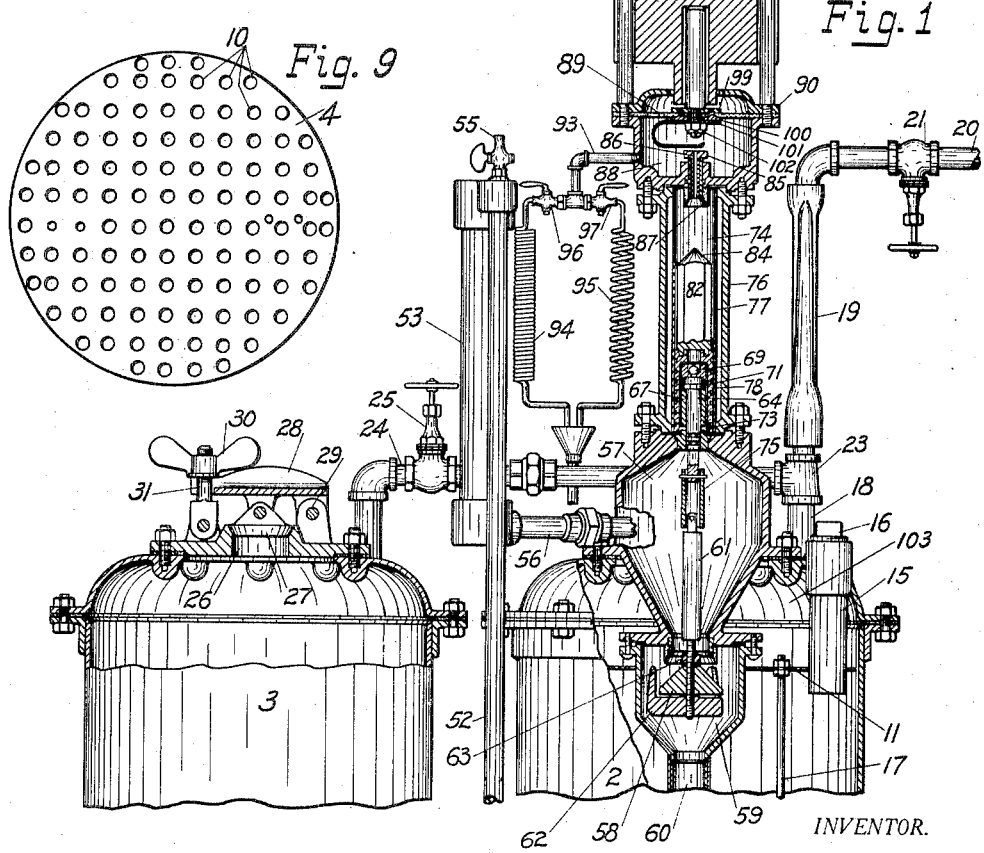
INVENTOR.
BY Carl H. Nordell
Walter A. Knight
ATTORNEY.

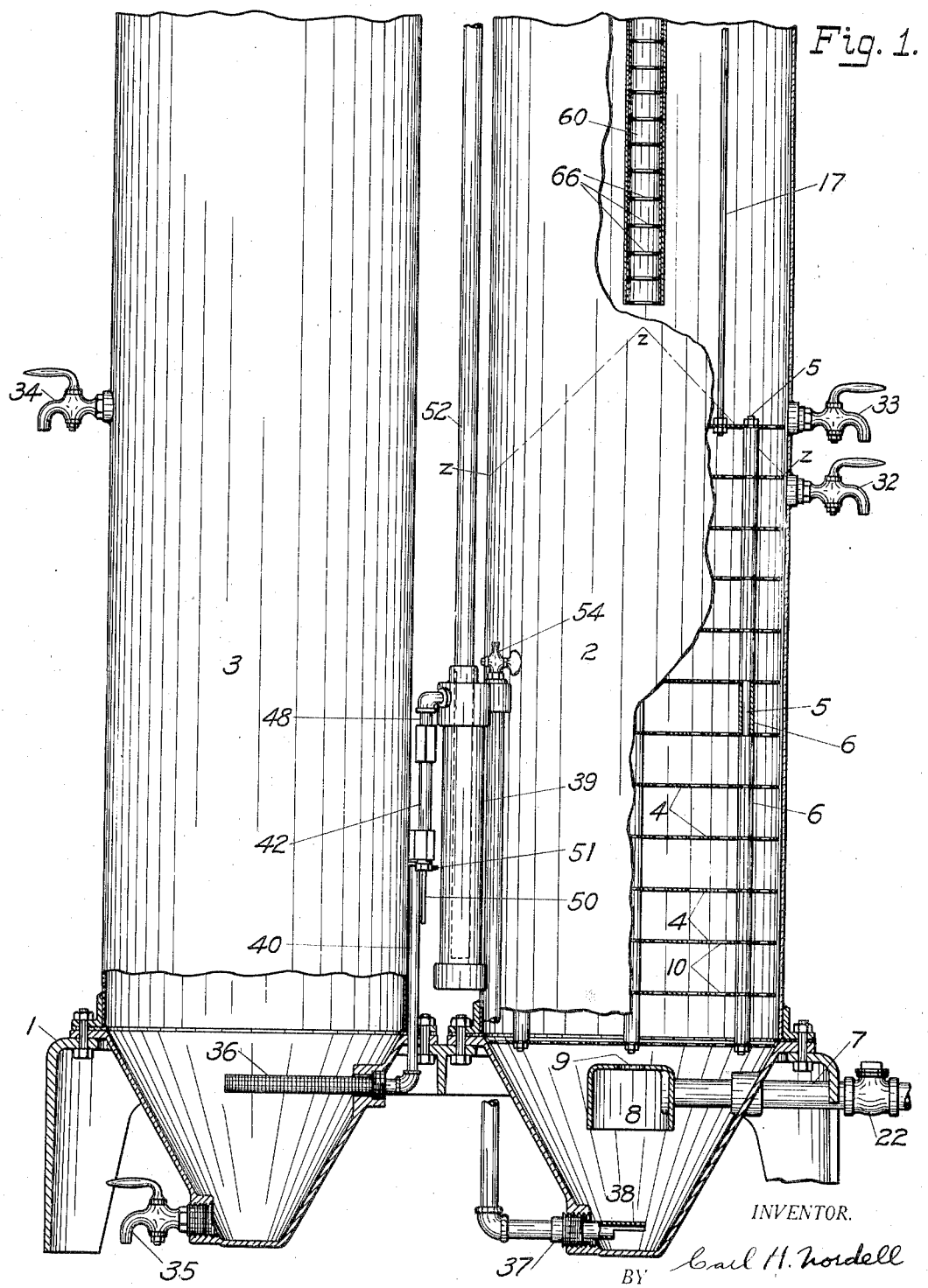

July 30, 1929.  C. H. NORDELL  1,722,938
AUTOMATIC WATER SOFTENING APPARATUS
Original Filed Aug. 29, 1922  4 Sheets-Sheet 3
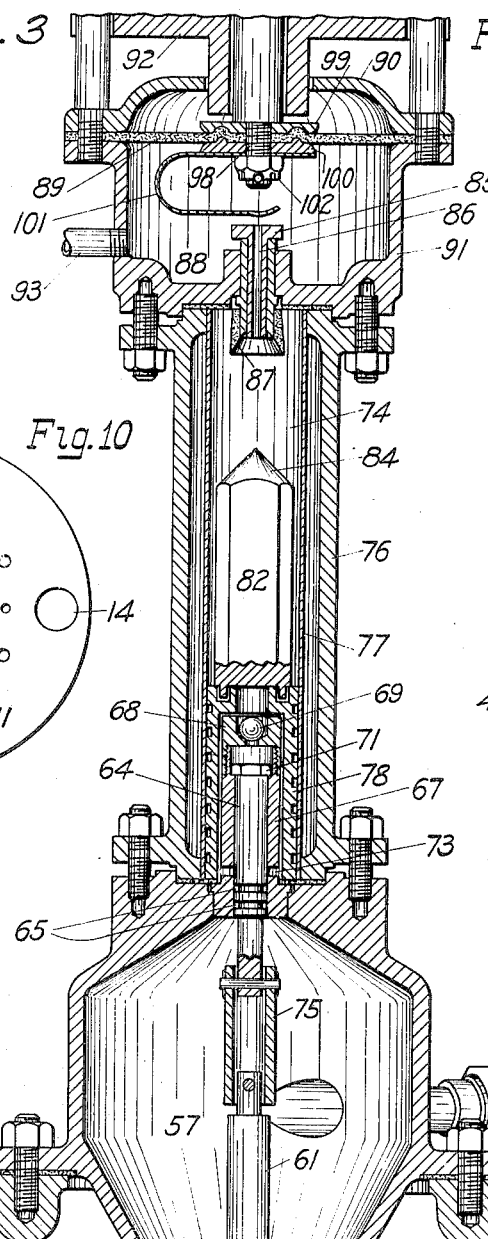
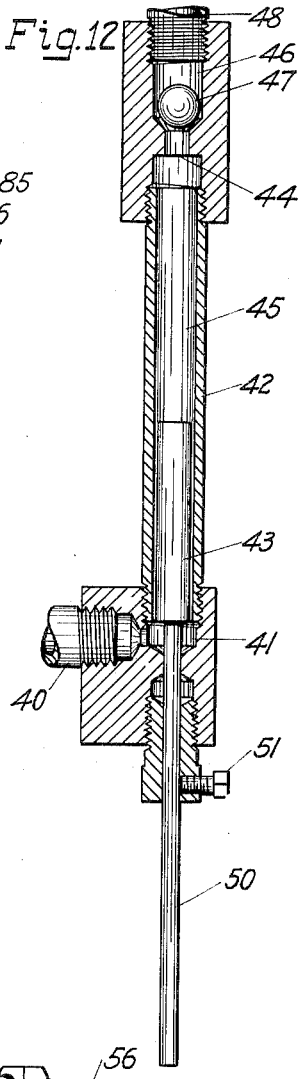
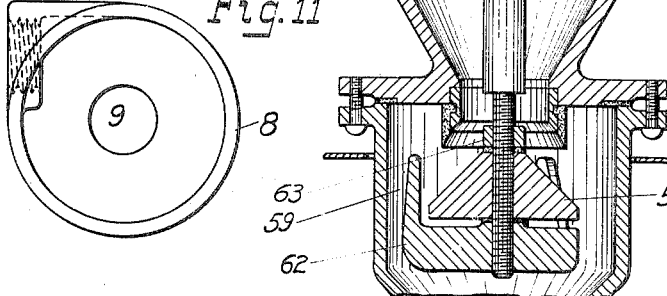
INVENTOR.
Carl H. Nordell
BY Walter A. Knight
ATTORNEYS

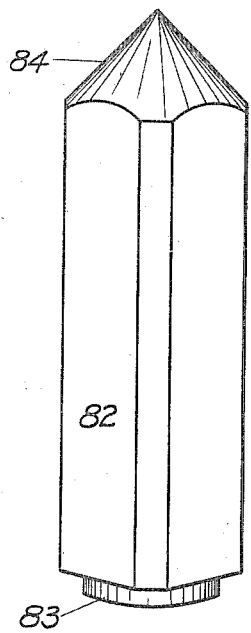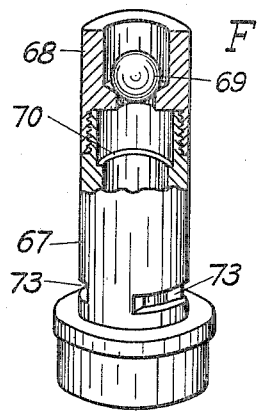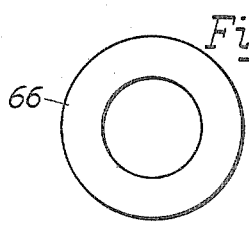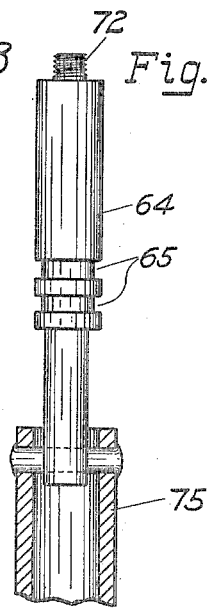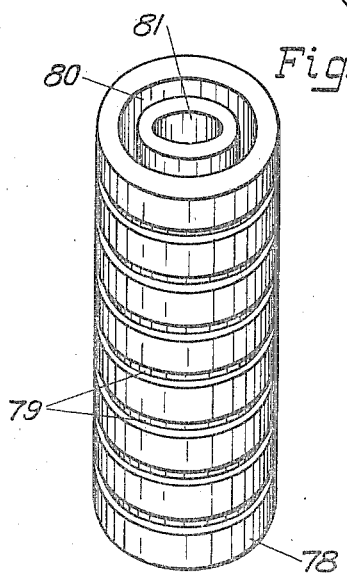

Patented July 30, 1929.

1,722,938

UNITED STATES PATENT OFFICE.

CARL H. NORDELL, OF FORT WAYNE, INDIANA, ASSIGNOR TO THE PERMUTIT COMPANY, A CORPORATION OF DELAWARE.

AUTOMATIC WATER-SOFTENING APPARATUS.

Application filed August 29, 1922. Serial No. 585,045.

My invention relates to a method of and automatically operated apparatus for the softening of water by the use of zeolites. The word zeolites as herein used includes hydrated alumina silicates or any other material having base exchange properties.

This invention does not pertain to zeolite water softeners of the filter type wherein a fixed bed of zeolites is substituted for the usual filter bed of sand and alternately hard water is softened by passing it through the bed of zeolites until they have practically lost their water softening efficiency and then the apparatus is shut down and a regenerating fluid is passed through the bed of zeolites and the zeolites are then washed free of the regenerating fluid. But my invention relates generally to automatically operated apparatus adapted to permit the simultaneous softening of water and reconditioning of zeolites, the zeolite bed being removable part at a time for regeneration, such as set forth in my co-pending applications filed July 21, 1921, Serial No. 487,465, and the one filed May 25, 1922, Serial No. 561,095; and uses a control valve of the general character shown in my co-pending application filed July 20, 1922, Serial No. 576,247.

The apparatus of the present invention is generally similar to the apparatus illustrated and described in my said co-pending application No. 561,095, the zeolites being circulated progressively through a water softening chamber in the main casing, one or more zeolite regenerating chambers outside the main casing and a zeolite washing chamber. The washing chamber may be wholly or partly submerged in the water softening casing as a means of making the apparatus more compact.

The apparatus herein illustrated and described is designed particularly for domestic use. The demand for service in domestic use imposes peculiarly difficult conditions, viz, while the average consumption of soft water per minute would be very low, the peak demands for very short spaces of time would be very high. For instance, a family whose normal use of soft water is 200 gallons a day is likely to use 100 gallons during the first one and one half hours of the day and during this time soft water will be withdrawn for service at the rate of about ten gallons a minute. The total time during which water is withdrawn for service during a day would ordinarily average forty minutes or less, leaving twenty-three hours and twenty minutes during which no water is withdrawn.

The present invention meets these short peak demands for soft water, the apparatus being adapted to hold a sufficient quantity of zeolites to afford water softening capacity for domestic use for one day without reconditioning. While reconditioning is constantly going on in the apparatus both day and night, tending to maintain the full efficiency of the zeolites at all times, much of the mineral, particularly in the lower portion of the water softening chamber, will be substantially exhausted during the day and during the night when no soft water is being withdrawn this mineral will be automatically removed, circulated and completely reconditioned so that by morning when re-use begins the entire bed of zeolites will be at maximum water softening efficiency. The mechanism herein shown keeps the whole apparatus within such moderate size as makes it suited for domestic use.

Salt consumption is minimized by measuring the brine delivered to the regenerating chamber; and this together with a large container for the salt makes it unnecessary to recharge the salt container oftener than once a month to once in four months, depending upon the amount of soft water used and the hardness of the raw water treated.

Substantially uniform charges of wet zeolites are forwarded from one chamber to another during treatment. The zeolites are remixed with water during their travel through connecting pipes to maintain the fluidity of the mixture throughout the cycle.

The hard water to be softened enters the main casing near the bottom and flows upwardly through a loose lying, constantly descending bed of zeolites, thus bringing the hardest water into contact with the most nearly exhausted mineral, then into contact with that of increasingly greater vitality and finally the nearly soft water into contact with the freshly reconditioned zeolites, effecting complete softening. This is one object of the present invention and differs from that of my co-pending application, Serial No. 561,095, in that the water being treated during softening does not pass upwardly through a rain of descending zeolites, the washing chamber terminating at its lower end only slightly above the bed of zeolites, and, as a matter of fact, when water is being softened, the upward flowing water loosens and raises the bed of zeolites so that they rise to an elevation considerably above the lower end of the washing chamber. When the upward flow of water to be softened ceases, the zeolites settle back into a bedded mass clear of the washing chamber tube.

As the zeolites pass downwardly through the washing chamber, soft water flows upwardly therethrough from the softening chamber to take their place, thus bringing the fresh water into contact with zeolites most nearly freed of brine and progressively bringing the water increasingly contaminated by salt into contact with mineral of increasing brine content. Brine and briny zeolites are thus prevented from passing into the softening chamber. The frequency of operation of the washing chamber valve is such that there is no period during which zeolites are not falling through the part of the washing chamber below the valve, hence the brine has no chance to settle into the water softening chamber.

The present invention covers a self contained apparatus upon a single supporting base, and therefore danger of injury or becoming out of alignment is minimized and great economy of space effected.

My invention is illustrated in the accompanying drawings in which:—

Figure 1 (the upper part of which appears on sheet one and the lower part on sheet two) shows in front elevation a complete continuous zeolite water softening apparatus, with parts broken away to expose the interior mechanism and parts shown in section to more clearly illustrate the apparatus, Fig. 2 is a top plan view of the apparatus, Fig. 3 is an enlarged view of the control valve, washing chamber and attendant apparatus in vertical axial section with inlet pipe shown out of its true position for the sake of clearness, Fig. 4, a detail, is an enlarged perspective of the poppet slug, Fig. 5, a detail, is an enlarged perspective of the ring slug, Fig. 6, a detail, is an enlarged elevation of the piston used to close the valve of the washing chamber, Fig. 7, a detail, is an enlarged perspective of the cylinder for said piston with parts broken away and in section, Fig. 8, a detail, is a plan view of one of the ring baffles in the washng chamber, Fig. 9, a detail, is a plan view of one of the perforated plates in the lower part of the softening chamber, Fig. 10, a detail, is a plan view of the partition between the softening chamber and the draw-off chamber, Fig. 11, a detail, is an under plan view of the cup-shaped deflector on the inlet pipe and Fig. 12, a detail, is an enlarged vertical axial section through the brine regulating valve.

Referring now to the drawings, 1 is a supporting base, upon which the water softening tank, 2, its attendant apparatus and the salt tank, 3, rest.

A bed of zeolites fills the tank, 2, from the bottom to the broken line, z, z, z. I prefer to use one or more perforated plates, 4, to partially support the zeolites, spread them out over the whole cross sectional area of the tank, 2, and to distribute the water to be softened in its upward flow. When a plurality of plates, 4, are used, they are held in place by the rods, 5, and spacers, 6, and as so assembled are nested within the tank, 2, as shown in Fig. 1. Pet cocks, 32, 33 are provided to test the height of the bed of zeolites in the tank, 2.

The hard water to be softened enters the tank, 2, through the check valve, 22, and supply pipe, 7, which terminates inwardly in a cup shaped deflector, 8, preferably made with a central outlet hole, 9, in the top thereof. The pipe, 7, preferably enters the deflector, 8, tangentially so as to cause the water to rotate within the deflector, and flow out into the tank, 2, with less disturbance of the surrounding water and zeolites.

The hard water, already well spread out over the cross sectional area of the tank, 2, passes upwardly through the perforations, 10, in the plates, 4, and the body of zeolites below the lowest one, between the several plates, and above the uppermost of the plates, 4. The force of the upwardly flowing water loosens the bed of zeolites and during the softening operation this loose lying bed of zeolites occupies a greater space in the tank, 2; the heighth to which its top rises depending upon the rate of flow of the water being treated, but in no case rising above the perforated partition, 11, into the draw-off chamber, 103. The partition, 11, has perforations, 12, to distribute the water flowing therethrough, a central opening, 13, through which extends the zeolite valve chamber, 59, and an opening, 14, through which extends the fill-pipe, 15, through which zeolites are supplied to the tank, 2. A plug, 16, is provided for the fill-pipe, 15. Rods, 17, having suitable nuts, secure the partition, 11, to the topmost perforated plate, 4, in suitable spaced relation.

As regenerated zeolites are dropped through the washing chamber, 60, into the tank, 2, the zeolites at the top of the tank, 2, have full water softening capacity and approach exhaustion progressively toward the bottom; those at the bottom of the tank, 2, being useless for softening water until they have been regenerated. This condition of relative efficiency of the zeolites at different heights in the tank, 2, is constantly maintained by feeding reconditioned zeolites on top of the mass and withdrawing exhausted zeolites from the bottom of the mass, as will more fully appear, hereinafter. As the hard water passes upwardly through the zeolites, it comes in contact first with the nearly exhausted zeolites, and progressively with those of greater water softening efficiency as the water becomes more and more relieved of its hardening constituents, so that finally near the top, the water is completely softened by the zeolites that are of full efficiency.

After being softened the water passes through the perforations, 12, of the partition, 11, and out through the pipe, 18, which is provided with a choke-bored section, 19, to the service line, 20. A hand operated or other valve, 21, is provided for shutting off the supply of soft water to the service fixtures (not shown). The soft water discharge pipe, 18, is provided with a T, 23, from which leads off a pipe, 24, to the salt tank, 3. A manually operated or other valve, 25, in this pipe line, 24, is provided to shut off the flow of water while the salt tank is being refilled.

The salt tank, 3, is provided with a salt charging opening, 26, in the top head, adapted to be closed by a stopper plug, 27, pivoted to a clamping arm, 28, which, in turn, is screwed to the head at one end by a pivot, 29, and held down at the other by a winged nut, 30, on a pivoted draw bolt, 31. A pet cock, 34, is provided to draw off part of the water in the tank, 3, before refilling the same with salt. A drain cock, 35, is provided at the bottom of the tank, 3. A screened outlet, 36, to let off the brine is provided near the bottom of the tank, 3.

The bottom of the water softening tank, 2, is provided with an outlet pipe, 37, the inwardly extending end of which is cut away underneath to form a shield, 38, to keep the zeolites from becoming packed in too solid a mass against the outlet orifice. Through this outlet pipe, as will be more fully explained hereinafter, substantially uniform charges of wet zeolites are withdrawn from the tank, 2, and conveyed to a regenerating chamber, 39.

A pipe, 40, conveys brine from the screened brine outlet, 36, into the lower chamber, 41, of the brine feeder, 42, raising the loose fitting piston, 43, until it strikes against the valve seat, 44, lifting the check valve, 47, and forcing the body of brine from the central chamber, 45, into the upper chamber, 46, and causing a like amount of brine previously in the upper chamber, 46, to flow out through the pipe, 48, into the regenerating chamber, 39, where it comes into contact with the exhausted zeolites and is mixed with them to remove the hardening elements therefrom.

When the charge of brine has been delivered from the brine feeder, 42, the check valve, 47, seats, preventing back flow of the brine; the loose fitting piston, 43, falls by gravity, the brine passing around it into the central chamber, 45. A rod, 50, may be adjusted by the set screw, 51, to limit the descent of the piston, 43, thus regulating the quantity of brine admitted to the brine feeder at one time, a like quantity being discharged into the regenerating chamber, 39, during the admission of each charge of mineral to the said regenerating chamber.

The zeolites pass from the chamber, 39, through the pipe, 52, into an upper regenerating chamber, 53, entering near its top, and are there subjected to further contact with the brine carried up with the zeolites. The chambers, 39 and 53, have air cocks, 54, 55, respectively, to discharge trapped air when the apparatus is first put in operation. In these chambers, 39 and 53, the zeolites are mixed with brine maintaining a mixture sufficiently fluid to flow freely as successive charges are advanced.

It will be seen that each regenerating chamber with its entrance orifice near the top and its exit orifice near the bottom constitutes an effective trap, preventing the back flow of zeolites and liquid into the preceding chamber. Entrapped air will be carried out along with charges of zeolites and liquid after the apparatus is in full operation.

Regenerated mineral passes from the chamber, 53, through the pipe, 56, into the upper washing chamber, 57. The chamber, 57, has a conical bottom and is separated from the lower washing chamber, 60, by a zeolite valve, 58, in valve chamber, 59. The element forming the chamber, 60, is submerged within the tank, 2, making the apparatus more compact. The chamber, 60, is provided with a plurality of ring baffles, 66. The valve, 58, is secured to a valve rod, 61, near its lower end and has a valve stop, 62, also secured to said rod. Both valve, 58, and stop, 62, are locked in position on the rod, 61, by the nut, 63.

The valve, 58, is raised to a seating position by means of the upward pressure of water in the chamber, 57, upon a piston, 64, which has labyrinthine packing rings, 65, and is adapted to fit loosely in a cylinder, 67, secured to the top of the element forming the upper washing chamber, 57. The cylinder, 67, is provided with a head, 68, in which is seated a ball check valve, 69, and is also provided with a shoulder, 70, upon which the nut, 71, secured to the threaded stud, 72, of the piston, 64, rests. The cylinder is provided with ports, 73, through which water flows to the regulating valve chamber, 74, when the valve, 58, is seated. The piston, 64, is connected to the valve rod, 61, by a universal joint, 75.

The regulating valve consists of a housing, 76, lined with the tube, 77. In the bottom of this tube is a loose fitting ring slug, 78, with labyrinthine packing rings, 79, and an annular recess, 80, on its upper end concentric with the axial opening, 81, therein. The lower end of the ring slug, 78, is bored to loosely receive the cylinder, 67, thus saving space and making the apparatus more compact. Above the ring slug, 78, is a loose fitting poppet slug, 82, substantially square in cross section and having on its lower end a ring boss, 83, adapted to seat in the annular slot, 80, of the ring slug, 78. When the annular boss, 83, seats in the annular slot, 80, it gives a dashpot effect, providing against shock when the poppet slug falls into contact with the ring slug upon being unseated by the downward pressure of the pusher pin as will hereinafter be explained. The top, 84, of the poppet slug, 82, is conical in shape forming a valve adapted to raise the pusher pin, 85, and close the opening, 87, in which the pusher pin is reciprocated when the poppet slug is raised to its extreme upward position by the upward flow of waste wash water through the regulating valve. The pusher pin is provided with an axial conduit, 86.

The rising piston, 78—82, forces the water above it in the chamber, 74, through the opening, 86, in the pusher pin, 85, into the portion of the chamber, 88, below the flexible diaphragm, 89, held securely in position between the upper portion, 90, and the lower portion, 91, of the diaphragm housing. A weight, 92, is adapted to offer resistance to the pressure of the water on the under side of the diaphragm and furnish power to unseat the poppet slug, as will hereinafter be described.

The water in the lower part of the chamber, 88, always flows out through the pipe, 93, more slowly than it enters through the valve from the chamber, 57. The water flows from the pipe, 93, through resistance coils, 94, 95, made of small tubing and of different resistance, preferably the former offering about twice the resistance of the latter. Cocks, 96, 97, permit the opening of either or both these coils for use as desired to regulate the speed of operation of the control valve. When the poppet slug, 82, has raised the pusher pin, 85, and closed the opening, 87, the valve seat being preferably resilient, the upward flow of waste wash water therethrough stops, whereupon the ring slug, 78, immediately falls by gravity to the position shown in Figs. 1 and 3. A shouldered stud, 98, passes through the upper washer, 99, diaphragm, 89, lower washer, 100, and the fixed end of the spring, 101, and all these parts are held securely in position by the nut, 102. When the poppet slug 82 seats, the diaphragm 89 is in raised position, and as the water passes out through the pipe, 93, the weight carries the diaphragm and attendant parts downward pressing the free end of the spring, 101, against the pusher pin, 85, forcing it down and unseating the poppet slug, 82; whereupon said slug immediately falls into contact with the ring slug, re-forming the piston, 78—82, which is again raised by the upwardly flowing wash water.

I do not limit myself to the apparatus herein illustrated and described, but conceive as within the scope of my invention, any method of softening water continuously by the use of zeolites and apparatus for carrying the same into effect that fall within the scope of the claims that may be ultimately allowed hereon.

Obviously, water or other liquids may be treated in like manner and with like apparatus for the removal of other than hardening substances held in solution therein.

In order to make clear the operation of the entire apparatus, suppose that a charge of mineral has just been advanced into the pipe, 37, from the bottom of the tank, 2, then referring to Figures 1, 2 and 3, the weight, 92, would be in a raised position, the diaphragm, 89, would be flexed upwardly, the poppet slug, 82, would be raised and seated in the opening, 87, preventing for the time being any further escape of the waste wash water into the chamber, 88. The ring slug, 78, and the valve, 58, with attendant parts would be in the position shown in the drawings.

As the weight, 92, is supported on the diaphragm, 89, the waste wash water previously admitted to the chamber, 88, is placed under pressure and by reason of this pressure flows out through the coils, 94 and 95. As the weight descends it causes the spring, 101, to bear more and more heavily on the pusher pin, 85, which, in turn, communicates this pressure to the apex of the poppet slug, 82, which is seated in the opening, 87. When the spring pressure has increased to such an extent that it overbalances the pressure of the water within the system, holding the poppet slug, 82, on the seat, 87, it unseats the poppet slug, 82, and throws it clear of its seat. As the poppet slug, 82, does not fill the entire cross section of the chamber, 84, it being substantially square in cross section while the chamber is circular, the poppet slug falls through the water until it comes into contact with the ring slug, 78, in the position shown in the drawings.

When the poppet slug is unseated the chamber, 74, has free communication to atmosphere through the conduit, 86, the chamber, 88, the pipe, 93, and the coils, 95 and 94, and hence the pressure in the chamber, 74, falls to a little above atmosphere. The pressure in the upper washing chamber, 57, which is in free communication with the softening chamber through the valve chamber, 59, and the wash chamber, 60, is therefore the same as that in the softening chamber:—that is to say, considerably above atmosphere. This pressure differential, therefore, on the piston, 64, causes it to rise carrying with it the valve, 58, until it seals the opening between chambers, 57 and 59, and is brought to rest by the fingers of the stop, 62, coming into contact with the element forming the upper part of the chamber, 59. When the stop, 62, brings the valve, 58, the connecting rod, 61, and the attendant piston, 64, to rest, the lower part of the piston, 64, clear the ports, 73, communicating with the chamber, 74, and through it to atmosphere, as previously described. The pressure in the chamber, 57, is therefore momentarily reduced to little above atmosphere as it has a substantially free communication therewith; but while sealed off from the valve chamber, 59, and the wash chamber, 60, it is connected with the softening chamber through the pipe, 56, the upper regeneration chamber, 53, the pipe, 52, the lower regeneration chamber, 39, and the pipe, 37. As the pressure in the softening chamber is much greater than atmosphere, a charge of wet mineral in the base of softening tank, 2, is then forced into the pipe, 37, displacing part of the mineral previously in pipe, 37, and advancing said advance charge into the chamber, 39, where, in turn, part of the brine and briny zeolites in the chamber, 39, are advanced into the pipe, 52, part of those in the pipe, 52, into the upper regeneration chamber, 53, part of those in the upper regeneration chamber, 53, into pipe, 56, and part of those in the pipe, 56, into the upper wash chamber, 57. Here the mineral falls to the bottom of the chamber and comes to rest upon the valve, 58, while the fluid flows through the ports, 73, into the tube, 77, raising the elements, 78 and 82, which in combination form a piston, until the poppet slug, 82, again seals the opening, 87, preventing further escape of waste wash water and causing the pressure in the tube, 77, the upper wash chamber, 57, the regeneration chambers, 39 and 53, with their communicating piping to substantially equalize with the pressure in the softening chamber, whereupon the ring slug, 78, again falls to the bottom of the tube, 77.

The valve, 58, then falls by gravity for the pressure on both sides, that is to say in chamber, 57 and 59, is equal and the ball check, 69, seats, preventing the drag created by the weighted valve and parts on the piston, 64, from lowering the pressure in chamber, 74, and tending to unseat the poppet slug, 82, now seated in the opening, 87. The valve, 58, and connected parts therefore fall gradually as the water passes upward between the piston, 64, and the walls of the cylinder, 78.

The zeolites deposited upon the valve, 58, fall by gravity into the valve chamber, 59, and thence through the baffled wash tube, 60. As the regenerated zeolites fall out of the chamber, 57, water to take their place must rise through the wash tube, 60, as it cannot readily enter the only other opening to the chamber, 57, which is through the pipe, 56, the chambers, 53 and 39, and pipes, 52 and 37, as they are filled by heavy, wet zeolites.

This water of displacement rising through the tube, 60, washes the descending mineral free of spent brine so that it is in condition to again soften water.

The flow of water upwardly through substantially the entire portion of the wash chamber, 60, is continuous even when no zeolites are entering the wash tube from the chamber, 57, as is the case when the valve, 58, is closed for then the zeolites in the valve chamber are falling into and through the wash tube, 60, and the upward flow of wash water through the wash tube is maintained. The timing of the successive charges of mineral must be such, of course, that the wash tube, 60, never becomes entirely empty of falling zeolites.

This upward flow of wash water is augmented by the amount of water required to raise the piston, 64, and seat the valve, 58, for this water rises through the wash chamber. It is further augmented by the slight settling back of the heavy, wet zeolites in the chambers, 39 and 53, and pipe, 52, when the valve, 58, opens.

The flow of brine through the brine feeder, 42, is produced when the charge of mineral is being advanced through the chambers, 39 and 53, and connecting piping, for at this time the pressure in the chamber, 39, is not as high as in the salt tank, 3, which is in free communication with the softening tank, 2, through the pipe, 24. The brine from tank, 3, flows to the lower pressure region in chamber, 39, when the charge of wet zeolites is being advanced and raises the brine piston, 43, as previously described. When the poppet slug, 82, seats and the pressures equalize throughout the system, the brine piston, 43, falls by gravity as previously described.

I claim as my invention and desire to secure Letters Patent of the United States:—

1. An apparatus for softening water with zeolites constituting a closed system opened intermittently to allow spent brine and wash water to flow to waste, having in combination a receptacle for zeolites within which water softening takes place, a receptacle within which zeolites are washed disposed within said softening receptacle so as to discharge washed zeolites upon the mass of zeolites within the softening receptacle, a salt tank, means for supplying water to said salt tank, regenerating receptacles in fluid connection with said receptacle in which water softening takes place, means for conveying brine from said salt tank to a regenerating receptacle, means for regulating the quantity of brine so conveyed, a fluid connection between the final regenerating receptacle and the washing receptable; and a control valve mounted upon and above said washing receptacle and connected therewith for regulating both the discharge of spent brine and wash water, and the circulation of the zeolites in successive charges from the water softening receptacle to the regenerating receptacle, from the regenerating receptacle to the washing receptacle, and from the washing receptacle to the water softening receptacle again.

2. In a pressure operated water softening apparatus the combination of a chamber within which water is continuously softened, so long as water is withdrawn from the soft water outlet, and a separate chamber for washing zeolites within said first mentioned chamber, said washing chamber open at its lower end to permit the washed zeolites to fall into the softening chamber.

3. In a pressure operated water softening apparatus the combination of a chamber within which water is continuously softened, so long as water is withdrawn from the soft water outlet, and a separate chamber for washing zeolites within said first mentioned chamber, and means for passing water through said chambers simultaneously, said washing chamber open at its lower end to permit the washed zeolites to fall into the softening chamber.

4. A method for softening water consisting in circulating zeolites part at a time through a zone wherein said zeolites are adapted to soften water, a zone wherein said zeolites are adapted to be regenerated, and a zone wherein regenerated zeolites are adapted to be washed, continuously supplying hard water to be softened to the zone wherein said zeolites are adapted to soften water, supplying brine to said zone wherein said zeolites are adapted to be regenerated, supplying wash water to the zone wherein said regenerated zeolites are adapted to be washed, using the force of the flowing water to effect the circulation of said zeolites through said zone, and further controlling said circulation by means adapted to be actuated by the force of the flowing water.

In testimony whereof I have hereunto set my hand.

CARL H. NORDELL.